United States Patent [19]
Vilcot

[11] 3,989,319
[45] Nov. 2, 1976

[54] SHAFT-SUPPORTING BEARING

[75] Inventor: Michel P. Vilcot, Saint-Germain-sur-Morin, France

[73] Assignee: Societe Anonyme: Poclain, Le Plessis-Belleville, France

[22] Filed: July 1, 1975

[21] Appl. No.: 592,213

[30] Foreign Application Priority Data
July 19, 1974    France .............................. 74.25269

[52] U.S. Cl. .................................................. 308/58
[51] Int. Cl.² .......................................... F16C 23/10
[58] Field of Search .............................. 308/58–62; 101/248, 213, 216

[56] References Cited
UNITED STATES PATENTS

| | | | |
|---|---|---|---|
| 625,318 | 5/1899 | Bradford | 101/216 |
| 2,785,021 | 3/1957 | Whittum | 308/58 |

*Primary Examiner*—Kenneth H. Betts
*Assistant Examiner*—Gene A. Church
*Attorney, Agent, or Firm*—Lewis H. Eslinger; Alvin Sinderbrand

[57] ABSTRACT

This invention relates to a bearing enabling a shaft to be pivotally mounted, constituted by a bearing body and by two half-bearings, the first half-bearing being fast with the bearing body, while the second half-bearing is mounted to slide in said body in a direction perpendicular to the plane defining the first half-bearing and a means for returning this second half-bearing into the configuration of effective holding of the shaft is interposed between said second half-bearing and the bearing body. The bearing surface of the second half-bearing is provided with a friction lining. One application of the present invention is the production of a cardan suspension in a grab bucket.

5 Claims, 3 Drawing Figures

SHAFT-SUPPORTING BEARING

The present invention relates to a shaft-supporting bearing.

In the domain of earthworking, shovels are made which are provided with grab buckets. These buckets are suspended from the articulated arms, coupled to the frame of the shovel, by an assembly of two bearings, of the cardan joint type, so-called due to their orthogonal character. The bucket may therefore take all desired orientations, but it is understood that the movements of thereof should generally be restrained in order to limit them to admissible amplitudes.

The braking is presently effected, for example, by discs coated with friction linings, which rub on fixed surfaces, transverse with respect to the axis of each shaft, disposed opposite each other.

The invention intends to propose a new arrangement which is noteworthy in that the braking device is no longer added, but integrated in the assembly of the shaft in its bearing.

The invention has for its general object not only an assembly of two bearings at right angles to each other, and also of a single bearing.

It is therefore a first object of the invention to provide a bearing allowing pivotal assembly of a shaft, constituted by a bearing body and by two half-bearing sections. A first half-bearing section is mounted in a fixed position in the bearing body, while a second parallely extending half-bearing section is mounted to slide in said body in a direction perpendicular to the plane defining the first half-bearing (i.e. between two positions towards and away from the first half-bearing section) means are provided for returning or biasing this second half-bearing into its normal configuration (i.e. first position) wherein it holds the shaft between said second half-bearing and the bearing body.

The bearing surface of the second half-bearing is provided with a friction lining.

The preferred embodiment of the return means is in accordance with one of the following two variants:
 the return means is constituted by a spring,
 the return means is constituted by a jack and by a source of pressurised fluid placed in communication with the inlet chamber of this jack, the effect of the pressure of the fluid in said jack tending to place the second half-bearing in abutment on the shaft.

It is also an object of the invention to provide an assembly of two bearings enabling two shafts to be pivotally mounted, each bearing being constituted by a bearing body, common to the two bearings and by two half-bearings. A first half-bearing section of each bearing is fast with the bearing body, whilst the second half-bearing section are mounted to slide in this bearing body in a common direction perpendicular to the parallel planes defining the first half-bearings (i.e. between first and second positions towards and away from their associated first half-bearing sections) and a means for returning or biasing these two half-bearings into the configuration of holding of the two shafts is interposed between said second half-bearings (i.e. into their first positions against the shaft).

The bearing surface of each second half-bearing is provided with a friction lining.

The return means is preferably constituted either by a spring or by two jacks and by a source of pressurised fluid placed in communication with the inlet chambers of these jacks, the effect of the pressure of the fluid in said jacks tending to place each second half-bearing in abutment on the corresponding shaft.

The invention will be more readily understood on reading the following description with reference to the accompanying drawings, in which.

Figure 1:
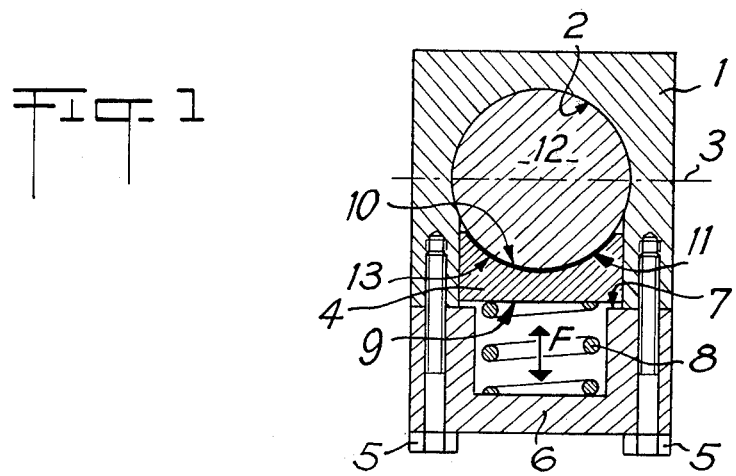
FIG. 1 is a section, perpendicular to the axis of the supported shaft, of a simple bearing according to the invention.

Referring now to the drawings, FIG. 1 shows an assembly constituted by a bearing body 1, provided with a first half-bearing 2, on opposite sides of a plane 3 bisecting the bearing, which is fixedly mounted in or integrally formed with the bearing body and a second half-bearing section 4 mounted in the bearing body so as to be able to slide easily in the direction F perpendicular to plane 3 towards and away from the first half-bearing section. A bearing cover 6 is fixed by screws 5 on the body 1 and limits by its face 7 the slide of the mobile half-bearing 4. A spring 8 interposed between the cover 6 and the rear face 9 of this half-bearing 4 has for its effect to hold the bearing face 10 of said half-bearing 4 on the cylindrical face 11 of a shaft 12.

It will further be noted that, in the present case, the bearing face 10 constitutes the outer face of a layer 13 of friction material, similar to that of the brake linings.

Figure 2:
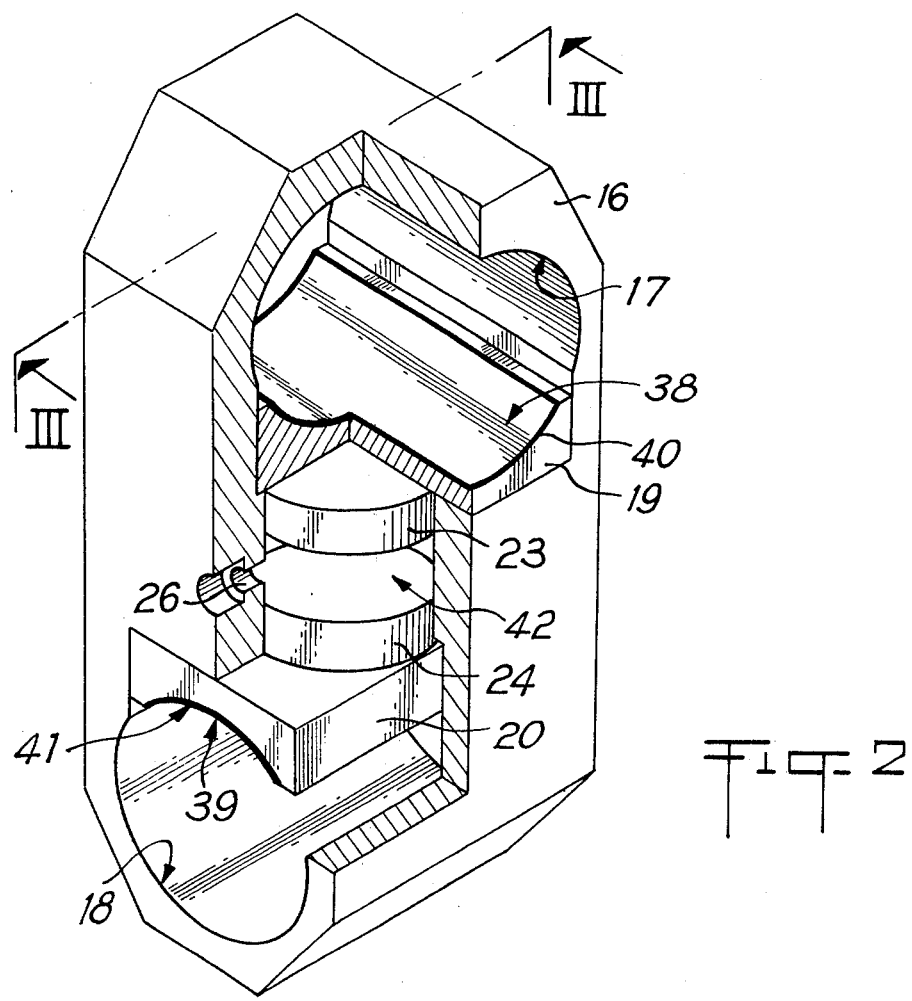
FIG. 2 is a perspective view of a double bearing according to the invention.
Figure 3:
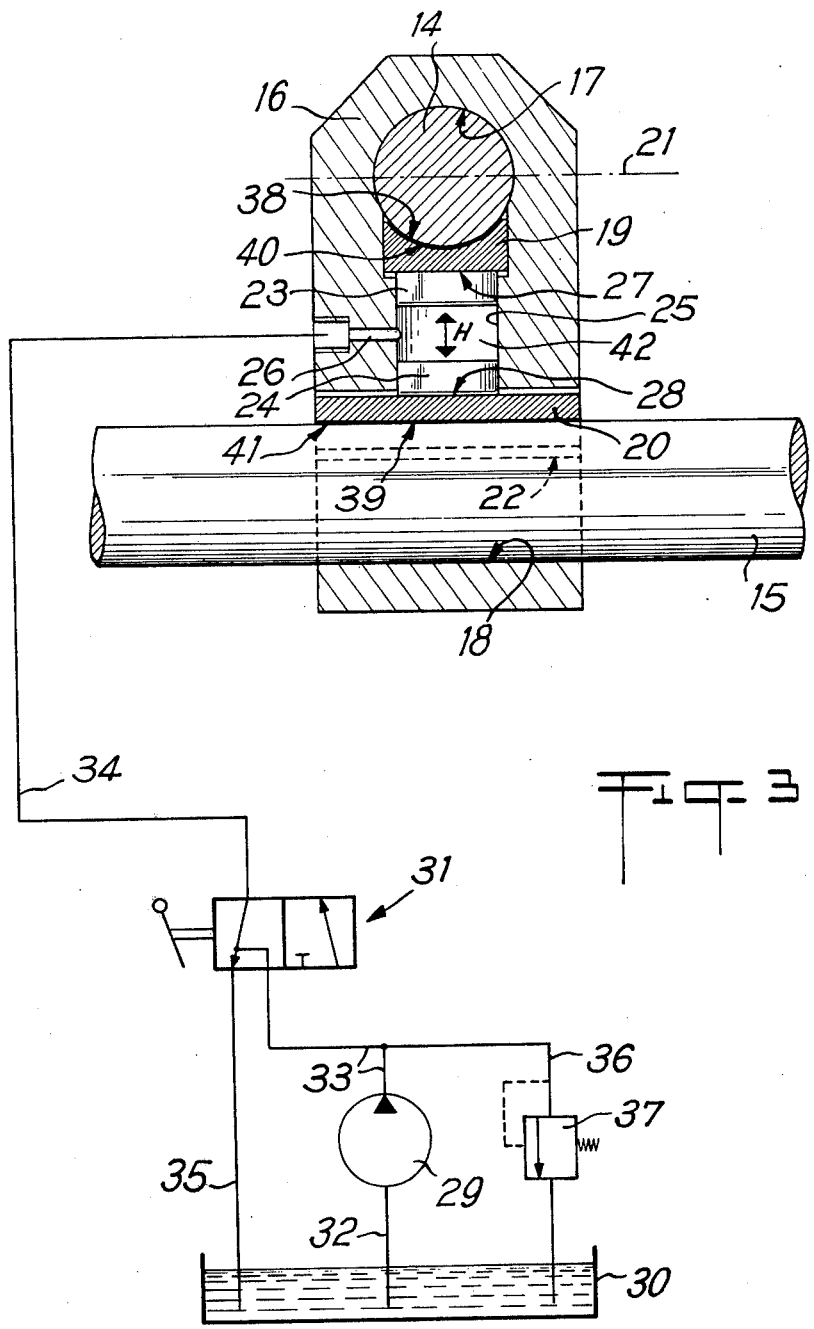
FIG. 3 is a section along III—III of FIG. 2.

Furthermore, as a variant, the spring 8 could be replaced by a pressurised fluid, as in the second embodiment of FIGS. 2 and 3.

In this embodiment, two orthogonal shafts 14 and 15 are held in a bearing body 16 by composite bearings constituted by first half-bearings 17 and 18, fast with the body 16 and by second half-bearings 19 and 20, mounted to slide slightly in the body 16 in a direction H perpendicular to the two parallel planes 21 and 22, which define the half-bearings 19 and 20, respectively.

Two pistons 23, 24 are mounted to slide in a common bore 25 made in the body 16, and are disposed on either side of a pressurised fluid supply orifice 26. These pistons 23, 24 are in abutment on the rear faces 27, 29 of the half-bearings 19, 20 and push said latter into abutment on the shafts 14, 15 respectively.

A pressurised fluid feed device is constituted by a pump 29, which is connected to a fluid tank 30 by its suction pipe 32 and to a two way distributor 31 by its delivery pipe 33. Pipes 34, 35 connect the distributor 31 to orifice 26 and to tank 30. Finally, a pipe 36 is connected to the delivery pipe 33, which it connects to the tank 30, a calibrated discharge valve being disposed in this pipe 36.

The two positions of the distributor 31 correspond as follows:
 the first position corresponds to the communication of pipes 33 and 34 and to the obturation of pipe 35; and
 the second position, to the communications of pipes 33, 34 and 35.

Finally, it will be noted that the faces 38, 39 of the half-bearings 19, 20 constitute the faces of layers 40, 41 of a friction material.

The use of the variant of FIG. 1 benefits from the advantages on the one hand of a supple assembly of the half-bearing 4, on the other hand of the braking provoked by the friction material 13.

The supple assembly by means of a spring 8 enables the effect of the shocks which may be exerted on the shaft 12, to be attenuated.

The surface 10 being that of a friction material, the force of abutment of the half-bearing 4 on the shaft 12 generating a force parallel to the arrow F, and the course rotation of the shaft 12 then generates a force of friction tangential to face 10. This force of friction brakes the movement of the shaft 12 with respect to the body of the bearing 1, this being sought after, when this movement is not a continuous rotation but on the contrary a pivoting.

It is understood that such a braking is also obtained concerning shafts 14 and 15 with respect to the bearing body 16, when, the distributor 31 being disposed in its first position, the pressurised fluid reaches the chamber 42 defined, between the two pistons 23, 24, by said latter and the bore 25. The half-bearings 19 and 20 are then pushed in firm abutment on the shafts 14, 15 and their faces 38, 39 brake said shafts.

One application of the present invention consists in the production of a Cardan suspension of a grab bucket.

What we claim is:

1. A bearing allowing pivotal assembly of a shaft, comprising a bearing body including two opposed half bearing sections defining therebetween a bore for receiving a shaft, said first half-bearing section being fixed in the bearing body, said second half-bearing section being mounted to slide in said body in a direction towards and away from the first half bearing section between a first position wherein the second half bearing section cooperates with the first half bearing section to define a bore therebetween to hold a shaft and a second position located further away from said first half bearing section than said first position, and means for biasing said second half-bearing section into said first position to hold the shaft between said half-bearing sections and a friction lining on said second half bearing section for frictionally engaging the shaft when the second half bearing section is in said first position.

2. A bearing as claimed in claim 1, wherein the biasing means is comprising a spring.

3. A bearing as claimed in claim 1, wherein the biasing means comprises a jack formed in said bearing body including a pressure chamber, said second half bearing section forming one side of said chamber, and a source of pressurized fluid placed in communication with said chamber, whereby the effect of pressure of fluid in said jack tends to place the second half-bearing section in engagement with the shaft.

4. A bearing assembly enabling two shafts to be pivotally mounted therein, comprising a bearing body including two bearings for respectively receiving a shaft, each of said bearings including a first half-bearing section fixed in the bearing body, and a second half-bearing section mounted to slide in said bearing body in a direction towards and away from their associated first half-bearing section, between a first position wherein the second half bearing section cooperates with the first half bearing section to define a bore therebetween to hold a shaft and a second position located further away from said first half bearing section than said first position and means operatively connected to said second half bearing sections for biasing said second half-bearing sections into said first position to hold the shaft between said half-bearing sections; and a friction lining on said second half bearing sections for frictionally engaging their associated shafts when the second half bearing section is in said first position.

5. A bearing assembly as claimed in claim 4, wherein the biasing means comprises a jack formed in said bearing body including a pressure chamber, said second half-bearing sections forming sides of said chamber, and a source of pressurized fluid placed in communication with said chamber of said jack, whereby the effect of the pressure of fluid in said jack tends to place each second half-bearing section in engagement on the corresponding shaft.

* * * * *